United States Patent [19]

Siddoway

[11] Patent Number: 5,535,707
[45] Date of Patent: Jul. 16, 1996

[54] HEAD AND HORN PROTECTOR FOR STEERS

[76] Inventor: Brett L. Siddoway, 2331 N. 1350 W., Harrisville, Utah 84404

[21] Appl. No.: 379,781
[22] Filed: Jan. 27, 1995
[51] Int. Cl.⁶ .......................... A01K 17/00; A01K 29/00
[52] U.S. Cl. ............................................................. 119/851
[58] Field of Search ..................................... 119/851, 715, 119/857, 837

[56] References Cited

U.S. PATENT DOCUMENTS

D. 330,273  10/1992  Cernek ................................ 119/856 X
378,153   2/1888  Tiffany ................................ 119/856 X
3,052,216  9/1962  Blunt et al. ............................. 119/851

Primary Examiner—Robert P. Swiatek
Assistant Examiner—Yvonne R. Abbott

[57] ABSTRACT

A head and horn protector for steers including side head pads to protect the sides of a steer's head while the steer is being roped and pads that will surround and close tightly around the base of the horns of a steer to protect the horns and adjacent head area against abrasion and other injury as the animal is roped.

5 Claims, 3 Drawing Sheets

HEAD AND HORN PROTECTOR FOR STEERS

FIELD OF THE INVENTION

This invention relates to protective gear to be placed on the head, neck and horns of steers to be roped.

PRIOR ART

During repeated roping of steers as part of rodeo events or the practicing for such rodeo events it is not uncommon that the braided rope used will cause abrasions to the head, neck and horns of the steer. Consequently various apparatus have been developed that will provide protection to these vulnerable parts of a steer. In general, the apparatus heretofore used has involved a number of pads, held in place with a plurality of straps. Since the animal on which the apparatus is used does not have a cooperative nature it is often difficult to place the pads and to secure them in place.

BRIEF DESCRIPTION OF THE INVENTION

Objects of the Invention

Principal objects of the present invention are to provide a protective gear that will effectively protect the vulnerable head, neck and horn areas of a steer.

Another object is to provide protective gear that can be easily and safely installed on a steer.

Features of the Invention

Principle features of the invention include a pair of pads that will fit over the horns, head and neck of a steer. A single strap runs through guides and keepers on the pads and is arranged such that when the strap is pulled snug and the ends of the strap secured together the pads are tightened against the parts of the animal and are secured in place. The pads and the strap then serve to protect the animal's horns, neck and head against abrasion as the animal is intentionally roped around the horns, or unintentionally round a horn and neck or around the neck.

Additional objects and features of the invention will become apparent to those skilled in the art to which the invention pertains from the following detailed description and drawings.

THE DRAWINGS

In the drawings:

FIG. 1 is side elevation view of the head and horn protector for steers, shown mounted on a steer (shown fragmentarily) and viewed from one side of the steer;

FIG. 2 an opposite side elevation view of the protector shown mounted on the steer and viewed from the other side of the steer;

FIG. 3 a top plan view of the protector, as viewed from the top of the steer; and FIG. 4 a perspective view of the protector, taken from the front and above and showing the protector ready to be mounted on a steer.

DETAILED DESCRIPTION OF THE INVENTION

Figure 2:
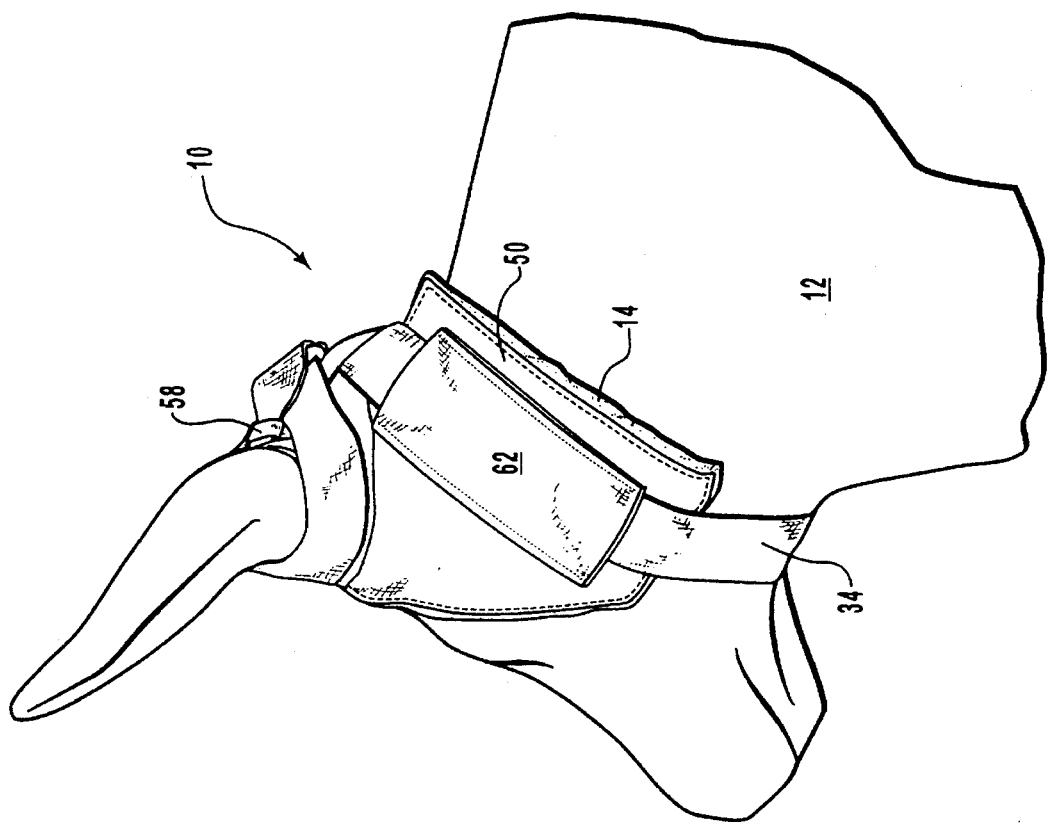
Figure 1:
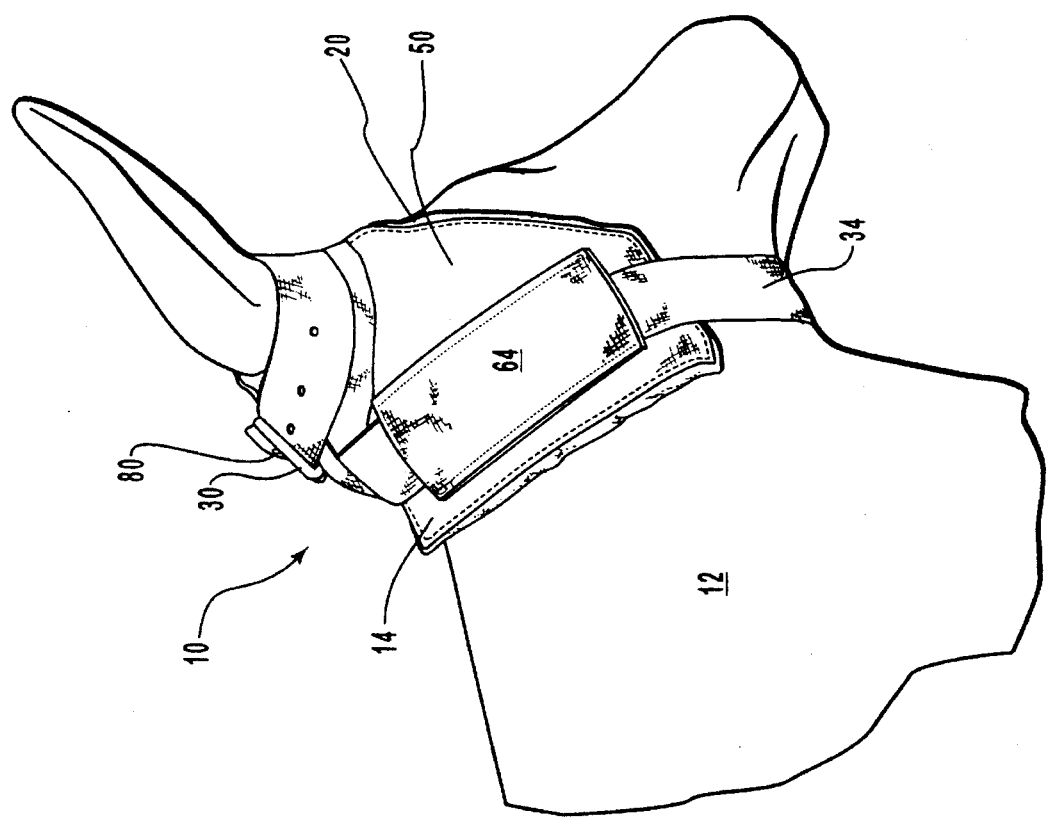
Figure 3:
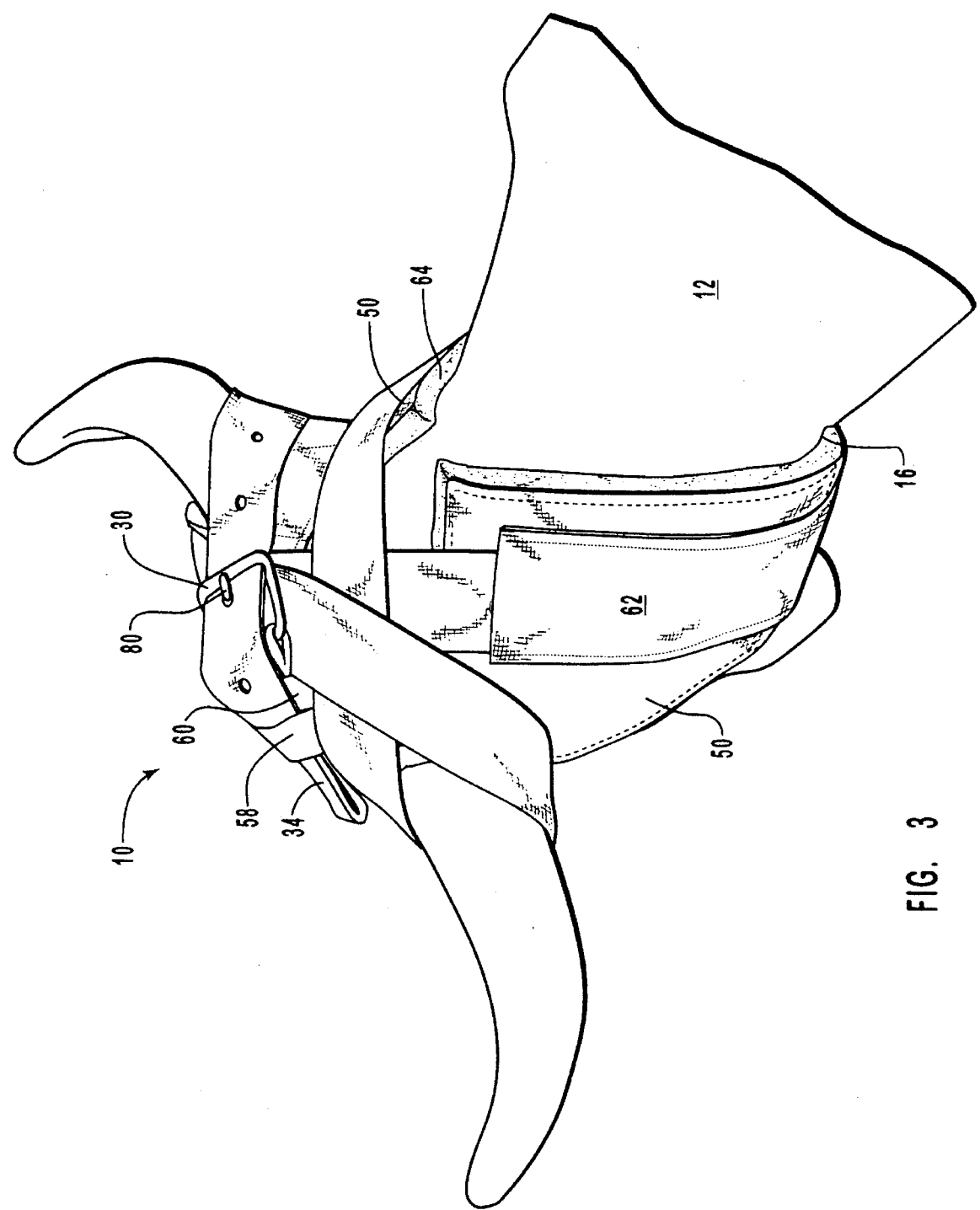
Figure 4:
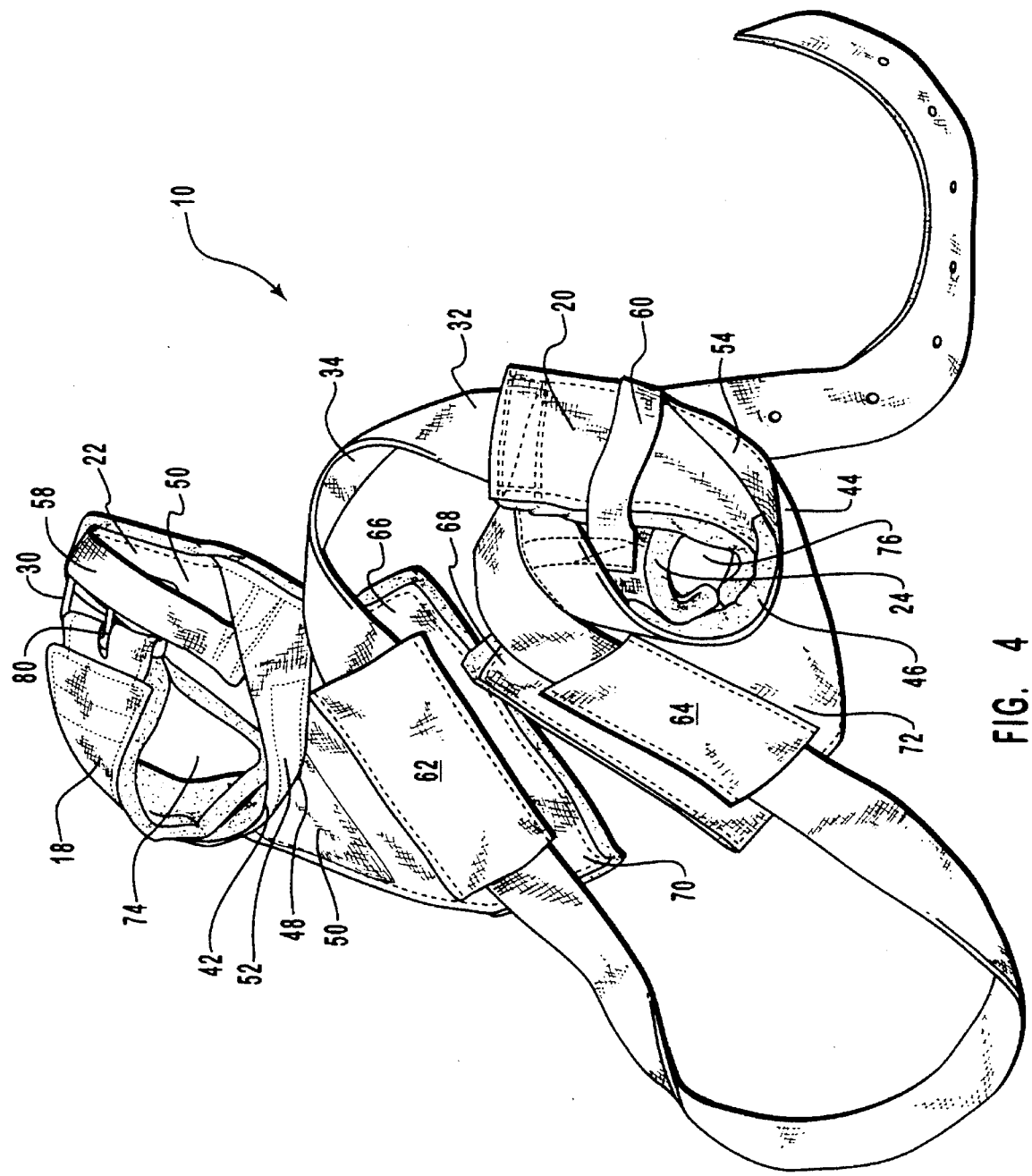

Referring now to the drawings:

In the illustrated preferred embodiment of the invention the head and horn protector of the invention is shown at 10 and in FIGS. 1–3 is mounted on a steer, shown fragmentarily at 12.

Protector 10 includes a pair of side head pads 14 and 16 made of a thick, soft padding material to respectively lie alongside opposite sides of the head of steer 12, without affecting the vision of the animal. Each side head pad 14 and 16 includes an extension, 18 and 20, respectively, that will each extend across the front of a steer horn, at the base of the horn.

Rear horn pads 22 and 24, respectively overlap the side head pads 14 and 16 and project therefrom such that they will extend across the back of a steer horn at the base of the horn. Rear horn pad 22 has a buckle 30 fixed to the end thereof arranged to pass around a steer horn. Rear horn pad 22 has one end 32 of a strap 34 sewn, or otherwise affixed thereto. A lower edge 40 of a bridging pad 42 overlies the juncture of the extension 18 of side head pad 14 and the rear horn pad 22 and the bridging pad 42 extends upwardly from the lower edge 40 with respect to the extension 18 and the rear horn pad 22. Similarly, a lower edge 44 of a bridging pad 46 overlies the juncture of extension 20 of the side pad 16 and rear horn pad 24 and the bridging pad 46 extends upwardly from the lower edge 44 with respect to the extension 20 and the rear horn pad 24.

Each of the side head pads 14 and 16, and the rear horn pads 22 and 24, is backed (on the side away from the steer, when the protector is positioned on a steer) with a heavy webbing material 50 that will give the pads a measure of rigidity and that will resist the abrasion of a rope used for steer roping. Similarly, web backings 52 and 54 are provided for the bridging pads 42 and 46. The ends of web backings 52 and 54 are each sewn as at 50 to the respective extension and rear horn pad overlapped by the bridging pads 42 and 46.

A web loop keeper 58 is fixed to extend along the end of the rear horn pad 22 and the end of the extension 18 is passed through the keeper 58 to have the buckle 30 secured thereto.

A web loop keeper 60 is fixed to extend along the end of the rear horn pad 24 to receive the extension 20 therethrough, with the strap 34 attached to the end of the extension 20.

Guides 62 and 64 extend from close to the upper edges 66 and 68, respectively, of side head pads 14 and 16, respectively, to locations close to lower edges 70 and 72, respectively, of the side head pads 14 and 16. The guides 62 and 64 are also preferably made of durable web material and are sewn lengthwise along their opposite side edges to the side head pads.

Strap 34, connected to the end of extension 20, passes downwardly through guide 62, beneath side head pad 14 and upwardly through the guide 64. In this configuration the protector 10 is ready for installation on a steer 12.

Protector 10 is installed on a steer by placing the portion of strap 34 extending between the lower edges of side head pads 14 and 16 beneath the head of the animal. The enclosure 74 formed by side head pad 14, rear horn pad 24 and bridging pad 42 is placed over the right horn of the animal and enclosure 76 formed by side head pad 16, rear horn pad 26 and bridging pad 46 is placed over the left horn of the animal. Thereafter, the running end of strap 34 is pulled to pull the extension 20 through the keeper 60, and to pull the strap down through the guide 62, beneath the head of the animal, up through the guide 64, between the horns of the animal, around the right horn, between the horns, around the left horn and through the buckle until pulled tight, at which time the finger 80 of the buckle is inserted through a hole 82 in the strap. The running end of the strap is ten inserted into and through the keeper 58.

With the protector 18 of the invention in place a rope thrown to catch the horns of the steer will settle to the base of the horns and will tighten around a portion of the protector such that the animal is not subjected to abrasion or other injury.

The protector is easily installed and has just one strap that is pulled to tighten both sets of extension to side head protector pad, rear horn pad and bridging pad around the horns of the animal.

Although a preferred form of my invention has been herein disclosed it is to be understood that the present invention is by way of example and that variations are possible without departing from the subject matter coming within the scope of the following claims, which subject matter I regard as my invention.

I claim:

1. A horn and head protector for steers comprising a pair of side head protector pads adapted to be positioned against the side of the head of a steer;

two sets of a plurality of pads adapted to surround a horn of a steer at the base of said horn; and a single strap means connected to said side protector pads and to each set of said pads adapted to surround a horn of a steer at the base of said horn whereby pulling on said single strap means will tighten said side head pads against the sides of the head of a steer on which said protector is used and that will tighten each of said sets of pads around a horn.

2. A horn and head protector for steers as in claim 1, wherein each of said side head protector pads and each of said pads of each said set of pads has a heavy web backing thereon.

3. A horn and head protector for steers as in claim 2, wherein each of said two sets of a plurality of pads adapted to surround a horn at the base of said horn includes an extension of a said side head protector pad, a rear horn pad and a bridging pad overlapping said head protector pad and said rear horn pad.

4. A horn and head protector for steers as in claim 3, wherein each said extension projects through a keeper fixed to a said rear horn pad.

5. A horn and head protector for steers as in claim 4, wherein said single strap means includes a buckle connected to one end of one of said extensions projecting through a keeper; and a strap having one end fixed to the other of said extensions and a running end passed downwardly through a guide on the side head protector pad having said buckle connected to the extension thereof, upwardly through a guide on the other side head protector and, when affixed to an animal, between the horns of the animal, around one horn, through the horns, and around the other horn to be connected to said buckle.

\* \* \* \* \*